United States Patent
Zhang et al.

(10) Patent No.: US 10,719,566 B1
(45) Date of Patent: Jul. 21, 2020

(54) DETERMINING NORMALIZED RATINGS FOR CONTENT ITEMS FROM A GROUP OF USERS OFFSETTING USER BIAS IN RATINGS OF CONTENT ITEMS RECEIVED FROM USERS OF THE GROUP

(71) Applicant: Facebook, Inc., Menlo Park, CA (US)

(72) Inventors: Chao Zhang, Fremont, CA (US); Tianshu Ren, Mountain View, CA (US); Zhiye Fei, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 259 days.

(21) Appl. No.: 15/982,305

(22) Filed: May 17, 2018

(51) Int. Cl.
G06F 16/9535 (2019.01)
G06F 16/907 (2019.01)
G06F 17/18 (2006.01)
G06Q 50/00 (2012.01)
G06F 17/13 (2006.01)

(52) U.S. Cl.
CPC ........ *G06F 16/9535* (2019.01); *G06F 16/907* (2019.01); *G06F 17/13* (2013.01); *G06F 17/18* (2013.01); *G06Q 50/01* (2013.01)

(58) Field of Classification Search
CPC .... G06F 16/9535; G06F 16/907; G06F 17/13; G06F 17/18; G06Q 50/01
USPC ........................................................ 707/748
See application file for complete search history.

(56) References Cited

U.S. PATENT DOCUMENTS

| | | | | |
|---|---|---|---|---|
| 8,407,230 | B2* | 3/2013 | Slaney | G06F 16/24578 707/748 |
| 8,938,463 | B1* | 1/2015 | Kim | G06F 16/9535 707/751 |
| 9,009,082 | B1* | 4/2015 | Marshall | G06Q 99/00 705/26.1 |
| 9,285,973 | B1* | 3/2016 | Gable | G06Q 30/0282 |
| 2001/0013009 | A1* | 8/2001 | Greening | G06Q 10/063112 705/7.14 |
| 2006/0259344 | A1* | 11/2006 | Patel | G06Q 10/0635 705/7.33 |
| 2009/0144226 | A1* | 6/2009 | Tateno | G06F 16/337 |
| 2009/0144272 | A1* | 6/2009 | Adarsh | G06Q 30/02 |
| 2011/0040759 | A1* | 2/2011 | Rappoport | G06F 16/3334 707/737 |

(Continued)

*Primary Examiner* — Phuong Thao Cao
(74) *Attorney, Agent, or Firm* — Fenwick & West LLP (57) ABSTRACT

An online system generates a model for determining quality scores for content items by presenting content items to a group of users who provide ratings for the content items. Based on ratings received from various users of the group, the online system generates the model. To mitigate bias from ratings received from different users of the group, the online system generates a distribution of ratings received from users of the group within a time interval and generates a cumulative distribution function by integrating the distribution. For a user of the group, the online system generates a user distribution of rankings received from the user. Additionally, for a rating received from the user, the online system determines a percentage of ratings received from the user less than the rating. Based on the cumulative distribution function and the percentage, the online system generates a normalized rating corresponding to the rating from user.

20 Claims, 3 Drawing Sheets

(56) References Cited

U.S. PATENT DOCUMENTS

| | | | | |
|---|---|---|---|---|
| 2012/0141028 A1* | 6/2012 | Choi | G06T 5/40 | 382/169 |
| 2014/0108426 A1* | 4/2014 | Goldberg | G06F 16/24578 | 707/748 |
| 2014/0304654 A1* | 10/2014 | Gross | G06F 3/0482 | 715/811 |
| 2015/0039549 A1* | 2/2015 | Aufmann | G06Q 30/0631 | 706/46 |
| 2015/0095108 A1* | 4/2015 | Savelli | G06F 16/24578 | 705/7.29 |
| 2015/0142910 A1* | 5/2015 | Harrang | H04L 67/2847 | 709/213 |
| 2015/0347413 A1* | 12/2015 | Brady | G06F 16/24578 | 707/751 |
| 2016/0170996 A1* | 6/2016 | Frank | G06F 16/24578 | 707/748 |
| 2017/0024764 A1* | 1/2017 | Mooser | G06F 16/9535 | |
| 2017/0124468 A1* | 5/2017 | Bolshinsky | G06F 16/24575 | |
| 2019/0130444 A1* | 5/2019 | Fei | G06F 16/24578 | |
| 2019/0147062 A1* | 5/2019 | Kim | G06Q 30/0202 | 707/748 |
| 2019/0205918 A1* | 7/2019 | Kim | G06Q 30/0243 | |

\* cited by examiner

DETERMINING NORMALIZED RATINGS FOR CONTENT ITEMS FROM A GROUP OF USERS OFFSETTING USER BIAS IN RATINGS OF CONTENT ITEMS RECEIVED FROM USERS OF THE GROUP

BACKGROUND

This disclosure relates generally to presenting content to users of an online system, and more specifically to presenting content to a group of users of the online system subject to limitations on a number of times certain content is presented within a time interval.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

When selecting content items for presentation to users, many online systems account for ratings or quality scores of content items. Ratings for content items are received from users of the online system may describe a user approval or disapproval of the content included in content items, describe likelihood of users interacting with the content included in content items, describe user assessment of whether content of content items is appropriate or inappropriate, or describe any other user reaction to the content of the content items. Based on ratings received for various content items, an online system may generate or train a model that determines a quality score for content items based on characteristics of content items and ratings received from users for content items having various characteristics.

Many online systems receive ratings for presented content items from a specific group of users. However, different users of the group often have different biases that affect how different users rate content items. These user-specific ratings biases may cause significant variation in how different users of the group rate similar content items. Hence, divergent ratings of a content item from different users of the group may be influenced more by particular biases of the different users than by characteristics of the content item itself. Accordingly, such user-specific biases in rating content items may impair training of a model for subsequent selection of content items by an online system that limits user interaction with the subsequently selected content items.

SUMMARY

An online system receives content items from one or more publishing users. Each content item includes content for presentation to users of the online system. One or more of the content items may also include a bid amount specifying an amount of compensation a publishing user provides to the online system in exchange for presenting the sponsored content item. Additionally, one or more content items may include an objective specifying a specific action that a publishing user desires other users to perform when presented with content included in the content item.

The online system identifies a group of users to provide ratings for various received content items and presents content items to users of the group. In various embodiments, the online system presents content items to particular users who provide ratings for the content items used to determine quality scores for the content items. A rating for a content item may describe a user's approval or disapproval of the content included in the content item, describe a user's likelihood of interacting with the content included in the content item, describe a user's assessment of whether the content of the content item is appropriate or inappropriate, or describe any other reaction to the content of the content item by a user. In various embodiments, the online system obtains ratings for content items from a group of specific users. The online system may select users from whom ratings are received and identify those users from a value or a setting included in user profiles maintained for the users. As another example, the online system maintains information identifying users for whom ratings for content items are received and retrieves the maintained information to identify the group of users.

The online system subsequently receives ratings of content items presented to users of the group from users of the group to whom the content items were presented. In various embodiments, the ratings are numerical values selected from a set. For example, a rating received from a user of the group is an integer between 1 and 5, with lower numbers indicating disapproval of a content item and higher numbers indicating approval of the content item. However, in other embodiments, a received rating is a value selected from any suitable set of discrete values. The online system stores a received rating in association with a content item for which the rating was received, as well as in association with a user from whom the online system received the rating. Hence, the online system stores received ratings in association with users from whom the ratings were received and in association with content items for which the ratings were received.

However, different users of the group have different biases or perceptions that influence how they rate presented content items. These biases affect ratings received from different users of the group for various content items. As the online system uses ratings received from users of the group to generate a model that determines quality scores for various content items, biases in how of different users of the group rate content items affects the quality scores subsequently generated by the online system for various content items. With the quality scores for content items used by the online system to select content items that are presented to users, user-specific biases affecting ratings for content items received from different users of the group may impair subsequent presentation of the content items to other users by generating quality scores for content items that prevent presentation of content items to certain users likely to be interested in the content items or that cause presentation of content items to users unlikely to be interested in the content items.

To mitigate user-specific biases of users of the group affecting subsequent generation of quality scores for content items, the online system retrieves ratings of content items received from users of the group within a specific time interval and generates a distribution of ratings from the retrieved ratings of content items received from users of the group within the specific time interval. For example, the online system retrieves ratings of content items received from users of the group during a particular month or within a time interval from a current time. Based on numbers of each rating received from users of the group within the specific time interval, the online system generates a distribution identifying different numbers of each rating received from users of the group during the specific time interval. Because the received ratings have discrete values in various embodiments, the online system generates a continuous distribution of ratings from the retrieved ratings from users of the group by attributing numbers of a specific rating to a range of values within a threshold amount of the specific rating. As an example for a rating specifying the integer 3, the online system attributes a number of ratings specifying the integer 3 to a range of values within 0.5 of 3 (i.e., values between 2.5 and 3.5). Within the range of values within the threshold amount of the specific rating, the online system 140 uniformly distributes the received number of the specific ratings. Accordingly, in the preceding example of the specific rating of the integer 3, the online system has an equal probability of attributing a received rating specifying the integer 3 to the value 3.4 or to the value 3.2. The online system subsequently stores the generated distribution of ratings.

The online system also selects a user of the group and generates a user distribution of ratings for the selected user by retrieving ratings previously received from the selected user. In some embodiments, the online system generates the user distribution of ratings for the selected user from ratings received from the selected user during the specific interval. Alternatively, the online system generates the user distribution of ratings for the selected user from ratings received from the selected user during an alternative time interval, such as a time interval longer than the specific interval (in other embodiments, the alternative time interval is shorter than the specific interval). Hence, the user distribution identifies numbers of different ratings that the online system previously received from the selected user. In various embodiments, the online system generates a user distribution for multiple users of the group of users. For example, the online system generates a user distribution for each user of the group of users.

The online system selects a content item that was previously presented to the selected user and retrieves a rating of the selected content item the online system received from the selected user. To offset user-specific bias that may have affected the rating of the selected content item received from the selected user, the online system determines a percentage of content items presented to the selected user for which the online system received a rating that is less than the rating of the selected content item received from the selected user. The online system determines a number of content items presented to the selected user for which the online system received a rating from the selected user and determines a number of content items for which the online system received a rating less than the rating of the selected content item. Additionally, the online system determines a number of content items presented to the selected user for which the online system received a rating equaling the rating of the selected content item. The online system determines a sum of the number of number of content items for which the online system received a rating less than the rating of the selected content item and one half the number of content items presented to the selected user for which the online system received a rating equaling the rating of the selected content item. To determine the percentage of content items presented to the selected user for which the online system received a rating that is less than the rating of the selected content item received from the selected user, the online system determines a ratio of the sum to the total number of content items presented to the selected user for which the online system received a rating from the selected user.

From the percentage of content items presented to the selected user for which the online system received a rating that is less than the rating of the selected content item received from the selected user, the online system generates a normalized rating for the selected content item by the selected user. To generate the normalized rating for the selected content item, the online system applies an inverse of the cumulative distribution function generated by integrating the distribution of ratings received from users of the group. Hence, the normalized rating for the selected content item has a probability that the distribution of ratings received from users of the group during the specific time interval has a value less than the normalized rating equals the percentage of content items presented to the selected user for which the online system received a rating that is less than the rating of the selected content item received from the selected user.

The online system stores the normalized rating in association with the content item. In some embodiments, the online system stores the normalized rating in association with the content item and with the selected user. Based on the normalized rating for the selected content item by the selected user and characteristics of the selected content item, the online system generates a model to determine a quality score for one or more content items. In various embodiments, the online system generates normalized ratings for multiple content items presented to users of the group based on ratings received from various users of the group, and uses characteristics of the content items and the normalized ratings to generate the model.

In some embodiments, the online system generates normalized ratings for a content item from each user of the group of users, as further described above. Additionally, the online system may generate a normalized rating for each content items presented to each user of the group of users, as further described above, and generate the model based on the normalized ratings for multiple content items from multiple users of the group. Subsequently, the online system applies the model to content items to determine quality scores for the content items and uses the quality scores to select content items for presentation to users.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
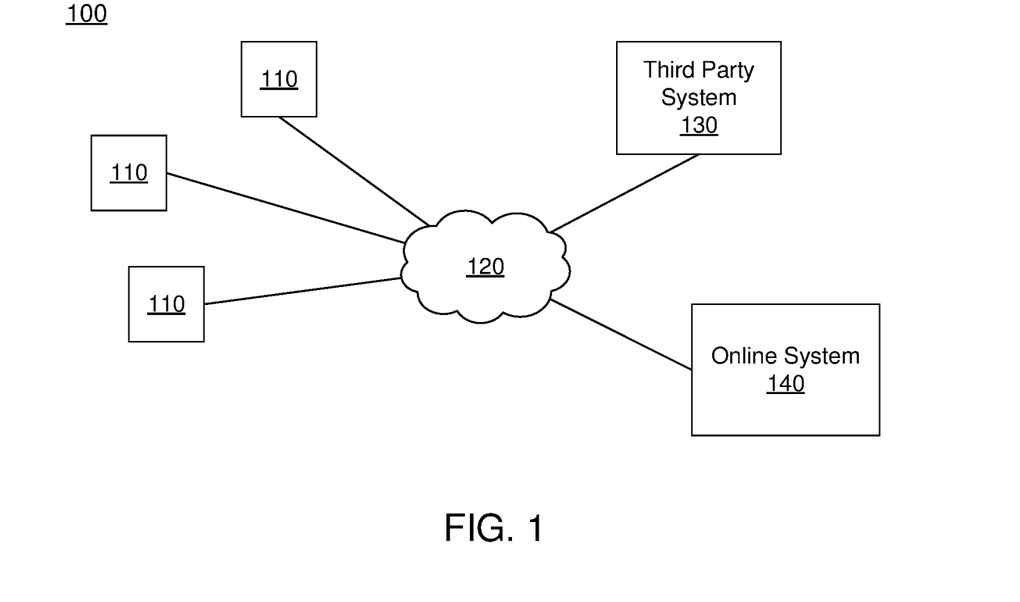
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 140 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item.

Figure 2:
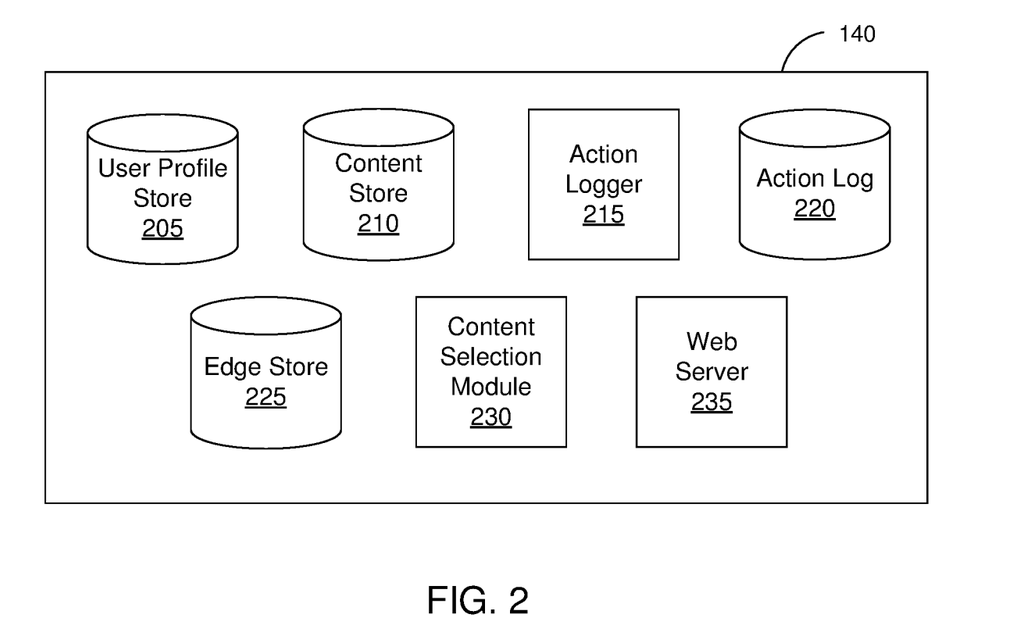
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative, which is content for presentation to a user, and a bid amount. As used herein, a content item including a bid amount is referred to as a "sponsored content item," while a content item that does not include a bid amount is referred to as an "organic content item." The creative is text, image, audio, video, or any other suitable data presented to a user. In various embodiments, the creative also specifies a page of content. For example, a content item includes a landing page specifying a network address of a page of content to which a user is directed when the content item is accessed. The bid amount included in a sponsored content item specifies an amount of compensation the online system 140 receives from a publishing user associated with the sponsored content item and is used to determine an expected value, such as monetary compensation, provided by the publishing user to the online system 140 if content in the sponsored content item is presented to a user, if the content in the sponsored content item receives a user interaction when presented, or if any suitable condition is satisfied when content in the sponsored content item is presented to a user. For example, the bid amount included in a sponsored content item specifies a monetary amount that the online system 140 receives from a publishing user who provided the sponsored content item to the online system 140 if content in the sponsored content item is displayed. In some embodiments, the expected value to the online system 140 of presenting the content from the sponsored content item may be determined by multiplying the bid amount by a probability of the content of the sponsored content item being accessed by a user.

Various sponsored content items may include an objective identifying an interaction that a user associated with a sponsored content item desires other users to perform when presented with content included in the sponsored content item. Example objectives include: installing an application associated with a sponsored content item, indicating a preference for a sponsored content item, sharing a sponsored content item with other users, interacting with an object associated with a sponsored content item, or performing any other suitable interaction. As content from a sponsored content item is presented to online system users, the online system 140 logs interactions between users presented with the sponsored content item or with objects associated with the sponsored content item. Additionally, the online system 140 receives compensation from a publishing user associated with a sponsored content item as online system users perform interactions with the sponsored content item that satisfy the objective included in the sponsored content item.

Additionally, a sponsored content item may include one or more targeting criteria specified by the publishing user who provided the sponsored content item to the online system 140. Targeting criteria included in a sponsored content item request specify one or more characteristics of users eligible to be presented with the sponsored content item. For example, targeting criteria are used to identify users having user profile information, edges, or actions satisfying at least one of the targeting criteria. Hence, targeting criteria allow a publishing user to identify users having specific characteristics as eligible to be presented with content from a sponsored content item, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows publishing users to further refine users eligible to be presented with sponsored content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), expressing a reaction to an object, and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements or other content with which the user engaged, purchases made, and other patterns from shopping and buying. Hence, the action log 220 may include information identifying content provided by one or more third party systems 130 that a user of the online system 140 has accessed or content provided by one or more third party systems 130 with which the user of the online system 140 otherwise interacted. Various third party systems 130 may include tracking mechanisms in content comprising instructions that, when executed by a client device 110, provide information identifying the content and identifying a user of the online system 140 associated with the client device 110 to the online system 140. In various embodiments, the information provided by the tracking mechanism identifies one or more products associated with a third party system 130 and include in, or otherwise associated with, the identified content. The information identifying the content is stored in the action log 220 in association with information identifying the user to the online system 140. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts (i.e., "sponsored content items"). The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. For example, the content selection module 230 generates a score for sponsored content items by combining bid amounts included in sponsored content items (or expected values of sponsored content items) with expected amounts of interaction with content included in the sponsored content items. The content selection module 230 selects sponsored content items and organic content items for presentation to the user based on their scores and measures of relevance (or expected amounts of interaction), respectively. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items including bid amounts (i.e., "sponsored content items") and other content items that do not include bid amounts ("organic content items"), such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed of content including a plurality of content items selected for presentation to the user. One or more content items may also be included in the feed of content. The content selection module 230 may also determine the order in which selected content items are presented via the feed of content. For example, the content selection module 230 orders content items content in the feed based on likelihoods of the user interacting with various content items.

In various embodiments, the content selection module 230 applies one or more models to content items that generate quality scores for various content items and uses the quality scores when selecting content items for inclusion in a feed of content presented to a user. The content selection model 230 obtains data for generating or for training the one or more models based on ratings for content items received from a group of users. However, ratings received from users of the group may be influenced by individual biases of the users providing the ratings. These user-specific biases may reduce an accuracy of quality scores generated for content items by the one or more models, impairing subsequent selection of content items for presentation to users.

To offset user-specific biases in ratings received from different users, the content selection module 230 generates a distribution of ratings of content items received from users of the group within a specific time interval. As further described below in conjunction with FIGS. 3 and 4, the content selection module 230 generates a cumulative distribution function from the generated distribution. For different users of the group, the content selection module 230 generates a user distribution based on ratings of content items received from the user. To offset bias from a user for a rating of a content item received from the user, the content selection module 230 retrieves a rating of the content item received from the user and determines a percentage of content items presented to the user by the online system 140 for which the online system 140 received a rating from the user that is less than the rating of the content item received from the user, based on the user distribution. As further described below in conjunction with FIGS. 3 and 4, the content selection module 230 applies an inverse of the cumulative distribution function to the determined percentage to generate a normalized rating of the content item. The normalized rating maps the rating of the content item by the user to the distribution of ratings received from users of the group, so the normalized rating mitigates specific bias of the user in rating content items, improving subsequent determination quality scores of content items by using the normalized ratings to generate models determining quality scores.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
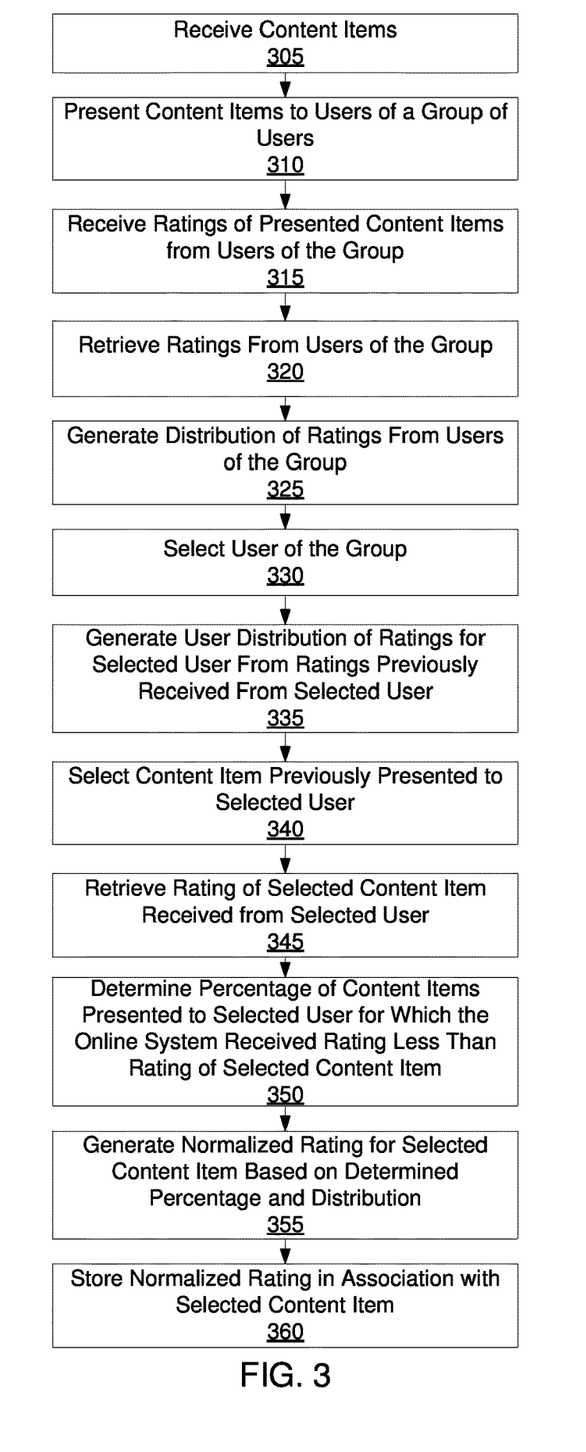
FIG. 3 is a flowchart of a method for generating normalized ratings of content items presented to users based on ratings of content items received from users of a group, in accordance with an embodiment.

Generating Normalized Ratings of Content Items Based on Ratings of Content Items from Users FIG. 3 is a flowchart of one embodiment of a method for generating normalized ratings of content items presented to users based on ratings of content items received from users of a group. In other embodiments, the method may include different and/or additional steps than those shown in FIG. 3. Additionally, steps of the method may be performed in different orders than the order described in conjunction with FIG. 3 in various embodiments.

The online system 140 receives 305 content items from one or more publishing users. Each content item includes content for presentation to users of the online system 140. In some embodiments, as further described above in conjunction with FIG. 2, one or more of the content items also include a bid amount specifying an amount of compensation a publishing user provides to the online system 140 in exchange for presenting the sponsored content item. For example, the bid amount included in a content item identifies an amount of compensation provided by a publishing to the online system 140 if content in the sponsored content item is presented to a user, if a user to whom content in the content item is presented performs one or more actions after being presented with the content, or if any suitable condition is satisfied when content in the content item is presented to a user. For example, the bid amount included in a content item specifies a monetary amount that the online system 140 receives from a publishing user who provided the content item to the online system 140 if content in the content item is displayed.

One or more content items may include an objective specifying a specific action that a publishing user desires other users to perform when presented with content included in the content item. Example objectives include: installing an application associated with the content item, indicating a preference for the content item, sharing a content item with other users, interacting with an object associated with a content item, purchasing an item via an application associated with the content item, or performing any other suitable action. Additionally, a content item may also include targeting criteria specifying characteristics of users of the online system 140 who are eligible to be presented with content from the content item in various embodiments. If a content item includes targeting criteria, the content item is eligible for presentation to users having characteristics satisfying at least a threshold amount of the targeting criteria and is not eligible for presentation to users having characteristics that do not satisfy at least the threshold amount of the targeting criteria. The online system 140 stores the content items received from the one or more publishing users.

The online system 140 identifies a group of users to provide ratings for various received content items and presents 310 content items to users of the group. In various embodiments, the online system 140 presents 310 content items to particular users who provide ratings for the content items used to determine quality scores for the content items. A rating for a content item may describe a user's approval or disapproval of the content included in the content item, describe a user's likelihood of interacting with the content included in the content item, describe a user's assessment of whether the content of the content item is appropriate or inappropriate, or describe any other reaction to the content of the content item by a user. In various embodiments, the online system 140 obtains ratings for content items from a group of specific users. The online system 140 may select users from whom ratings are received and identify those users from a value or a setting included in user profiles maintained for the users. As another example, the online system 140 maintains information identifying users for whom ratings for content items are received and retrieves the maintained information to identify the group of users.

The online system 140 subsequently receives 315 ratings of content items presented to users of the group from users of the group to whom the content items were presented. In various embodiments, the ratings are numerical values selected from a set. For example, a rating received 315 from a user of the group is an integer between 1 and 5, with lower numbers indicating disapproval of a content item and higher numbers indicating approval of the content item. However, in other embodiments, a received rating is a value selected from any suitable set of discrete values. The online system 140 stores a received rating in association with a content item for which the rating was received, as well as in association with a user from whom the online system 140 received 315 the rating. Hence, the online system 140 stores received ratings in association with users from whom the ratings were received 315 and in association with content items for which the ratings were received 315.

However, different users of the group have different biases or perceptions that influence how they rate presented content items. These affect ratings received 315 from different users of the group for various content items. As the online system 140 uses ratings received from users of the group to generate a model that determines quality scores for various content items, biases in how of different users of the group rate content items affects the quality scores subsequently generated by the online system 140 for various content items. With the quality scores for content items used by the online system 140 to select content items that are presented to users, user-specific biases affecting ratings for content items received 315 from different users of the group may impair subsequent presentation of the content items to other users by generating quality scores for content items that prevent presentation of content items to certain users likely to be interested in the content items or that cause presentation of content items to users unlikely to be interested in the content items.

To mitigate user-specific biases of users of the group affecting subsequent generation of quality scores for content items, the online system 140 retrieves 320 ratings of content items received 315 from users of the group within a specific time interval and generates 325 a distribution of ratings from the retrieved ratings of content items received 315 from users of the group within the specific time interval. For example, the online system 140 retrieves 320 ratings of content items received 315 from users of the group during a particular month or within a time interval from a current time. Based on numbers of each rating received 315 from users of the group within the specific time interval, the online system 140 generates 325 a distribution identifying different numbers of each rating received 315 from users of the group during the specific time interval. Because the received ratings have discrete values in various embodiments, the online system 140 generates 325 a continuous distribution of ratings from the retrieved ratings from users of the group by attributing numbers of a specific rating to a range of values within a threshold amount of the specific rating. As an example for a rating specifying the integer 3, the online system 140 attributes a number of ratings specifying the integer 3 to a range of values within 0.5 of 3 (i.e., values between 2.5 and 3.5). Within the range of values within the threshold amount of the specific rating, the online system 140 uniformly distributes the received 315 number of the specific ratings. Accordingly, in the preceding example of the specific rating of the integer 3, the online system 140 has an equal probability of attributing a received 315 rating specifying the integer 3 to the value 3.4 or to the value 3.2. The online system 140 subsequently stores the generated distribution of ratings.

The online system 140 also selects 330 a user of the group and generates 335 a user distribution of ratings for the selected user by retrieving ratings previously received 315 from the selected user. In some embodiments, the online system 140 generates 335 the user distribution of ratings for the selected user from ratings received 315 from the selected user during the specific interval. Alternatively, the online system 140 generates 335 the user distribution of ratings for the selected user from ratings received 315 from the selected user during an alternative time interval, such as a time interval longer than the specific interval (in other embodiments, the alternative time interval is shorter than the specific interval). Hence, the user distribution identifies numbers of different ratings that the online system 140 previously received 315 from the selected user. In various embodiments, the online system 140 generates 335 a user distribution for multiple users of the group of users. For example, the online system 140 generates 335 a user distribution for each user of the group of users.

The online system 140 selects 340 a content item that was previously presented to the selected user and retrieves 345 a rating of the selected content item the online system 140 received 315 from the selected user. To offset user-specific bias that may have affected the rating of the selected content item received 315 from the selected user, the online system 140 determines 350 a percentage of content items presented 310 to the selected user for which the online system 140 received 315 a rating that is less than the rating of the selected content item received 315 from the selected user. The online system 140 determines a number of content items presented 310 to the selected user for which the online system 140 received 315 a rating from the selected user and determines a number of content items for which the online system 140 received 315 a rating less than the rating of the selected content item. Additionally, the online system 140 determines a number of content items presented 310 to the selected user for which the online system 140 received 315 a rating equaling the rating of the selected content item. The online system 140 determines a sum of the number of number of content items for which the online system 140 received 315 a rating less than the rating of the selected content item and one half the number of content items presented 310 to the selected user for which the online system 140 received 315 a rating equaling the rating of the selected content item. To determine 350 the percentage of content items presented 310 to the selected user for which the online system 140 received 315 a rating that is less than the rating of the selected content item received 315 from the selected user, the online system determines a ratio of the sum to the total number of content items presented 310 to the selected user for which the online system 140 received 315 a rating from the selected user.

From the percentage of content items presented 310 to the selected user for which the online system 140 received 315 a rating that is less than the rating of the selected content item received 315 from the selected user, the online system 140 generates 355 a normalized rating for the selected content item by the selected user. To generate 355 the normalized rating for the selected content item, the online system 140 applies an inverse of the cumulative distribution function generated by integrating the distribution of ratings received 315 from users of the group. Hence, the normalized rating for the selected content item has a probability that the distribution of ratings received 315 from users of the group during the specific time interval has a value less than the normalized rating equals the percentage of content items presented 310 to the selected user for which the online system 140 received 315 a rating that is less than the rating of the selected content item received 315 from the selected user.

The online system 140 stores 360 the normalized rating in association with the content item. In some embodiments, the online system 140 stores 360 the normalized rating in association with the content item and with the selected user. Based on the normalized rating for the selected content item by the selected user and characteristics of the selected content item, the online system 140 generates a model to determine a quality score for one or more content items. In various embodiments, the online system 140 generates 355 normalized ratings for multiple content items presented to users of the group based on ratings received 315 from various users of the group, and uses characteristics of the content items and the normalized ratings to generate the model.

In some embodiments, the online system 140 generates 355 normalized ratings for a content item from each user of the group of users, as further described above. Additionally, the online system 140 may generate 355 a normalized rating for each content items presented 310 to each user of the group of users, as further described above, and generate the model based on the normalized ratings for multiple content items from multiple users of the group. Subsequently, the online system 140 applies the model to content items to determine quality scores for the content items and uses the quality scores to select content items for presentation to users.

Figure 4:
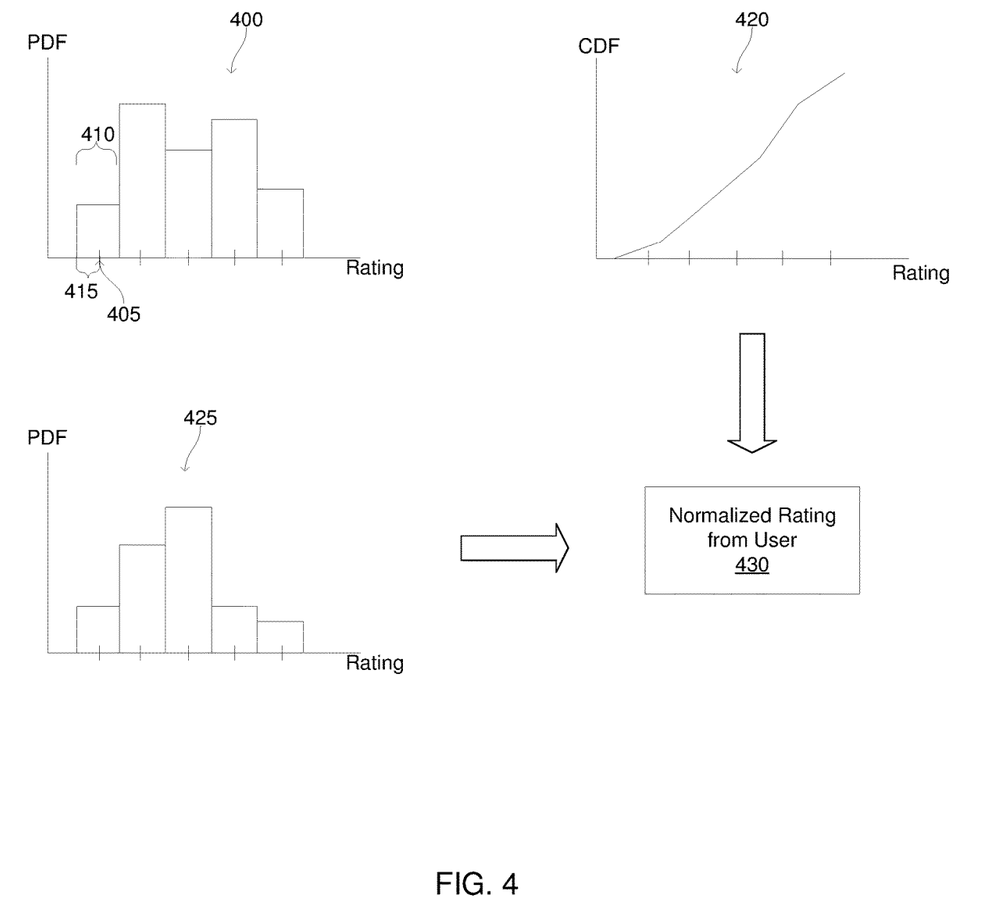
FIG. 4 is a process flow diagram of normalizing a rating of a content item received from a user, in accordance with an embodiment.

FIG. 4 is a process flow diagram of normalizing a rating of a content item received from a user. In the example of FIG. 4, an online system 140 generated a distribution 400 of ratings received from users of a group of users to whom content items were presented. As further described above in conjunction with FIG. 3, the distribution 400 is generated based on ratings received from users of the group within a specific time interval. In the example of FIG. 4, ratings received from users of the group have values selected from a discrete set of values (e.g., integers from 1 to 5). Accordingly, so the distribution 400 is continuous, the online system 140 attributes a number of received ratings having a particular value 405 of the set of discrete values to a range 410. As further described above in conjunction with FIG. 3, the range 410 includes values within a threshold amount 415 of the particular value 405. In the example of FIG. 4, the distribution 400 is a probability density function of values of the rating.

As further described above in conjunction with FIG. 3, the online system 140 generates a cumulative distribution function 420 from the distribution 400. To generate the cumulative distribution function 420, the online system 140 integrates the distribution 400. Accordingly, evaluating the cumulative distribution function 420 at a specific value results in a probability that the rating has a value less than the specific value.

In addition to generating the cumulative distribution function 420, the online system 140 generates a user distribution 425 for a user of the group based on ratings received by the online system 140 from the user for various content items. Accordingly, the user distribution 425 identifies ratings received from the user for content items. As further described above in conjunction with FIG. 3, the online system 140 selects a content item that was previously presented to the selected user and retrieves a rating of the selected content item received from the user. From the user distribution 425, the online system 140 determines a percentage of content items presented to the selected user for which the online system 140 received a rating that is less than the rating received from the user for the selected content item, as further described above in conjunction with FIG. 3. The online system 140 applies an inverse of the cumulative distribution function 420 to the determined percentage to generate a normalized rating 430 for the selected content item by the user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, content items for presentation to users of the online system;
presenting, by the online system, the content items to users of a group of users;
receiving ratings of content items presented to users of the group of users from users of the group of users to whom the content items were presented;
retrieving ratings of content items received from users of the group of users and stored by the online system within a specific time interval;
generating a distribution of ratings from the retrieved ratings of content items received from users of the group of users within the specific time interval;
generating a cumulative distribution function by integrating the distribution of ratings;
selecting a user of the group of users;
generating a user distribution of ratings for the selected user from ratings previously received from the selected user;
selecting a content item previously presented to the selected user;
retrieving a rating of the selected content item received from the selected user;
determining a percentage of content items presented to the selected user by the online system for which the online system received a rating from the selected user that is less than the rating of the selected content item received from the selected user;
generating a normalized rating for the selected content item by the selected user by applying an inverse of the cumulative distribution function to the percentage of content items presented to the selected user by the online system for which the online system received the rating from the selected user that is less than the rating of the selected content item received from the selected user; and
storing the normalized rating for the selected content item at the online system in association with the selected content item.

2. The method of claim 1, wherein determining the percentage of content items presented to the selected user by the online system for which the online system received the rating from the selected user that is less than the rating of the selected content item received from the selected user comprises:
determining a number of content items presented to the selected user;
determining a number of content items presented to the selected user for which the online system received a rating from the selected user equaling the rating of the selected content item;
determining a sum of one-half of the number of content items presented to the selected user having the rating matching the rating of the selected content items and a number of content items for which the online system received ratings less than the rating of the selected content item from the selected user; and
determining a ratio of the sum to the number of content items presented to the selected user.

3. The method of claim 1, further comprising:
generating a model to determine a quality score for one or more content items based on the normalized rating for the selected content item and characteristics of the selected content item.

4. The method of claim 3, further comprising:
applying the model to additional content items to determine quality scores for the additional content items based on characteristics of the additional content items and characteristics of the selected user; and
selecting one or more additional content items for presentation to the selected user based on the determined quality scores.

5. The method of claim 1, wherein generating the user distribution of ratings for the selected user from ratings previously received from the selected user comprises:
retrieving ratings of content items received from the selected user during the specific time interval; and
generating the user distribution of ratings from numbers of different ratings of content items received from the selected user during the specific time interval.

6. The method of claim 1, wherein generating the user distribution of ratings for the selected user from ratings previously received from the selected user comprises:
retrieving ratings of content items received from the selected user during an alternative time interval that is longer than the specific time interval; and
generating the user distribution of ratings from numbers of different ratings of content items received from the selected user during the alternative time interval.

7. The method of claim 1, wherein a rating comprises a value selected from a set of discrete values.

8. The method of claim 7, wherein generating the distribution of ratings from the retrieved ratings of content items received from users of the group of users within the specific time interval comprises:
determining numbers of received ratings having each discrete value of the set of discrete values;
for each discrete value of the set of discrete values:
attributing a number of received ratings having a discrete value of the set of discrete values to a range of values within a threshold amount of the discrete value.

9. A method comprising:
receiving, at an online system, content items for presentation to users of the online system;
presenting, by the online system, the content items to users of a group of users;
receiving ratings of content items presented to users of the group of users from users of the group of users to whom the content items were presented;
retrieving ratings of content items received from users of the group of users and stored by the online system within a specific time interval;
generating a distribution of ratings from the retrieved ratings of content items received from users of the group of users within the specific time interval;
generating a cumulative distribution function by integrating the distribution of ratings;
for each user of the group of users:
generating a user distribution of ratings for a user of the group of users from ratings previously received from the user;
selecting a content item previously presented to the user,
retrieving a rating of the selected content item received from the user;
determining a percentage of content items presented to the user by the online system for which the online system received a rating from the user that is less than the rating of the selected content item received from the user;
generating a normalized rating for the selected content item by the user by applying an inverse of the cumulative distribution function to the percentage of content items presented to the user by the online system for which the online system received the rating from the user that is less than the rating of the selected content item received from the user; and
storing the normalized rating for the selected content item at the online system in association with the selected content item.

10. The method of claim 9, wherein determining the percentage of content items presented to the user by the online system for which the online system received the rating from the user that is less than the rating of the selected content item received from the user comprises:
determining a number of content items presented to the user;
determining a number of content items presented to the user for which the online system received a rating from the user equaling the rating of the selected content item;
determining a sum of one-half of the number of content items presented to the user having the rating matching the rating of the selected content item and a number of content items for which the online system received ratings less than the rating of the selected content item from the user; and
determining a ratio of the sum to the number of content items presented to the user.

11. The method of claim 9, further comprising:
generating a model to determine a quality score for one or more content items based on the normalized rating for the selected content item and characteristics of the selected content item.

12. The method of claim 9, wherein generating the user distribution of ratings for the user from ratings previously received from the user comprises:
retrieving ratings of content items received from the user during the specific time interval; and
generating the user distribution of ratings from numbers of different ratings of content items received from the user during the specific time interval.

13. The method of claim 9, wherein generating the user distribution of ratings for the user from ratings previously received from the user comprises:
retrieving ratings of content items received from the user during an alternative time interval that is longer than the specific time interval; and
generating the user distribution of ratings from numbers of different ratings of content items received from the user during the alternative time interval.

14. The method of claim 9, wherein a rating comprises a value selected from a set of discrete values.

15. The method of claim 14, wherein generating the distribution of ratings from the retrieved ratings of content items received from users of the group of users within the specific time interval comprises:
determining numbers of received ratings having each discrete value of the set of discrete values;

for each discrete value of the set of discrete values:
attributing a number of received ratings having a discrete value of the set of discrete values to a range of values within a threshold amount of the discrete value.

16. A computer program product comprising a non-transitory computer readable storage medium having instructions encoded thereon that, when executed by a processor, cause the processor to:
receive, at an online system, content items for presentation to users of the online system;
present, by the online system, the content items to users of a group of users;
receive ratings of content items presented to users of the group of users from users of the group of users to whom the content items were presented;
retrieve ratings of content items received from users of the group of users and stored by the online system within a specific time interval;
generate a distribution of ratings from the retrieved ratings of content items received from users of the group of users within the specific time interval;
generate a cumulative distribution function by integrating the distribution of ratings;
select a user of the group of users;
generate a user distribution of ratings for the selected user from ratings previously received from the selected user;
select a content item previously presented to the selected user;
retrieve a rating of the selected content item received from the selected user;
determine a percentage of content items presented to the selected user by the online system for which the online system received a rating from the selected user that is less than the rating of the selected content item received from the selected user;
generate a normalized rating for the selected content item by the selected user by applying an inverse of the cumulative distribution function to the percentage of content items presented to the selected user by the online system for which the online system received the rating from the selected user that is less than the rating of the selected content item received from the selected user; and
store the normalized rating for the selected content item at the online system in association with the selected content item.

17. The computer program product of claim 16, wherein determine the percentage of content items presented to the selected user by the online system for which the online system received the rating from the selected user that is less than the rating of the selected content item received from the selected user comprises:
determine a number of content items presented to the selected user;
determine a number of content items presented to the selected user for which the online system received a rating from the selected user equaling the rating of the selected content item;
determine a sum of one-half of the number of content items presented to the selected user having the rating matching the rating of the selected content items and a number of content items for which the online system received ratings less than the rating of the selected content item from the selected user; and
determine a ratio of the sum to the number of content items presented to the selected user.

18. The computer program product of claim 16, wherein the non-transitory computer readable storage medium further has instructions encoded thereon that, when executed by the processor, cause the processor to:
generate a model to determine a quality score for one or more content items based on the normalized rating for the selected content item and characteristics of the selected content item.

19. The computer program product of claim 16, wherein a rating comprises a value selected from a set of discrete values.

20. The computer program product of claim 19, wherein generate the distribution of ratings from the retrieved ratings of content items received from users of the group of users within the specific time interval comprises:
determine numbers of received ratings having each discrete value of the set of discrete values;
for each discrete value of the set of discrete values:
attributing a number of received ratings having a discrete value of the set of discrete values to a range of values within a threshold amount of the discrete value.

* * * * *